No. 732,510. PATENTED JUNE 30, 1903.
G. R. BOULDING.
VEHICLE FRAME AND DRIVING AXLE GEAR.
APPLICATION FILED DEC. 31, 1902.
NO MODEL. 2 SHEETS—SHEET 1.
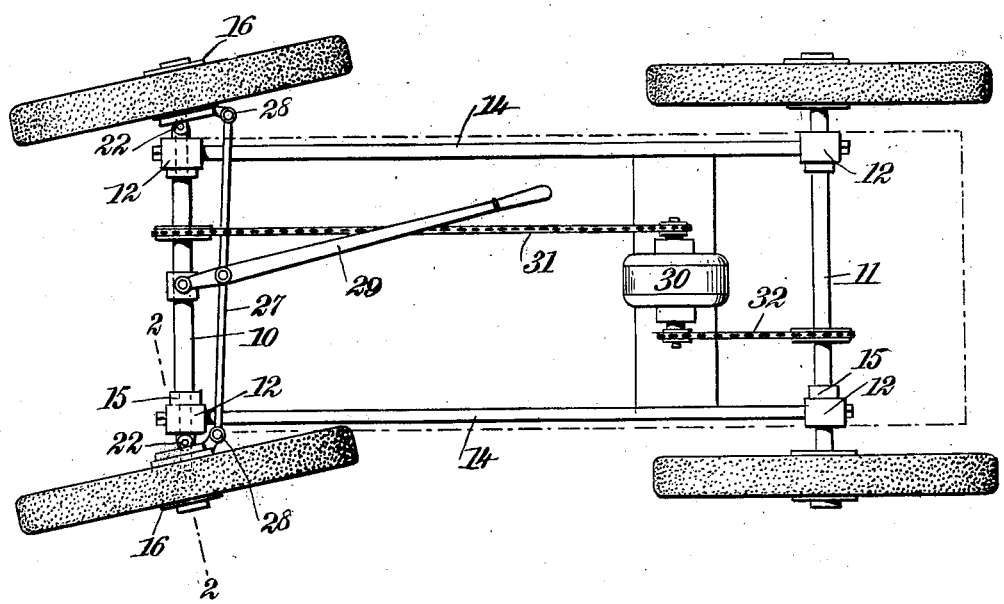
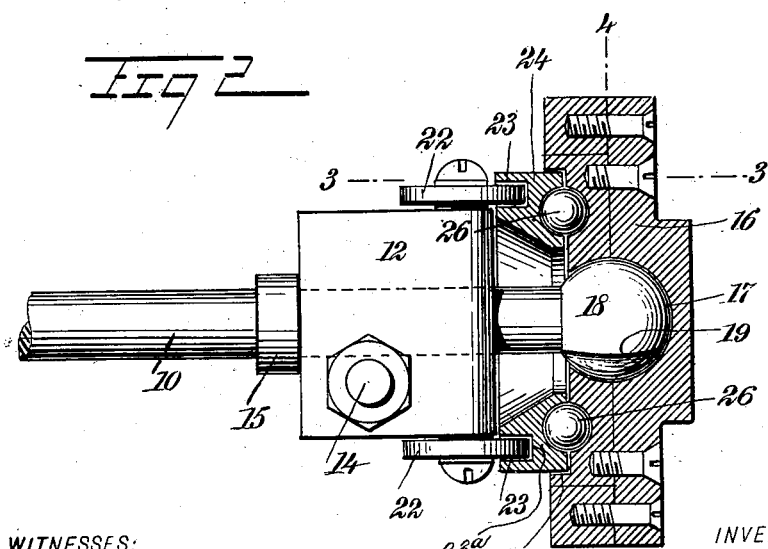
WITNESSES:
H. Walker
Isaac B. Owens.
INVENTOR
George R. Boulding
BY Munn
ATTORNEYS.

No. 732,510. PATENTED JUNE 30, 1903.
G. R. BOULDING.
VEHICLE FRAME AND DRIVING AXLE GEAR.
APPLICATION FILED DEC. 31, 1902.
NO MODEL. 2 SHEETS—SHEET 2.
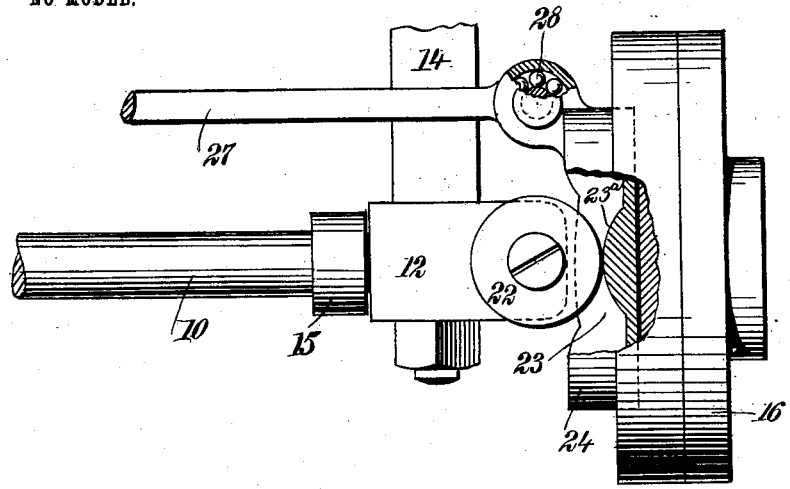
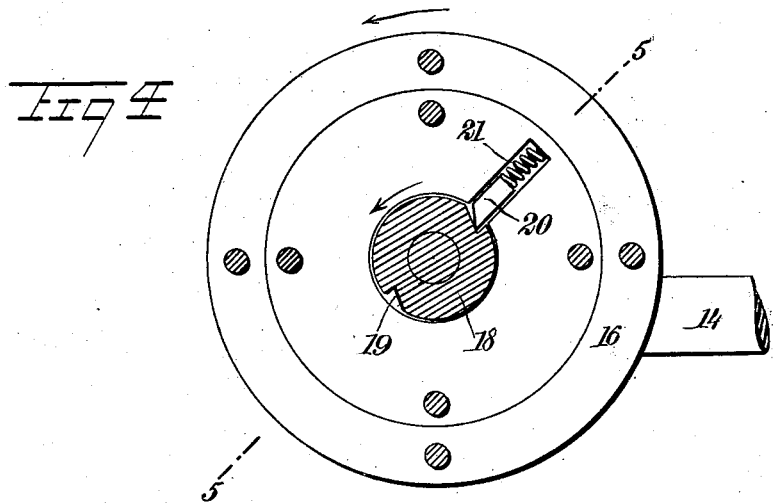
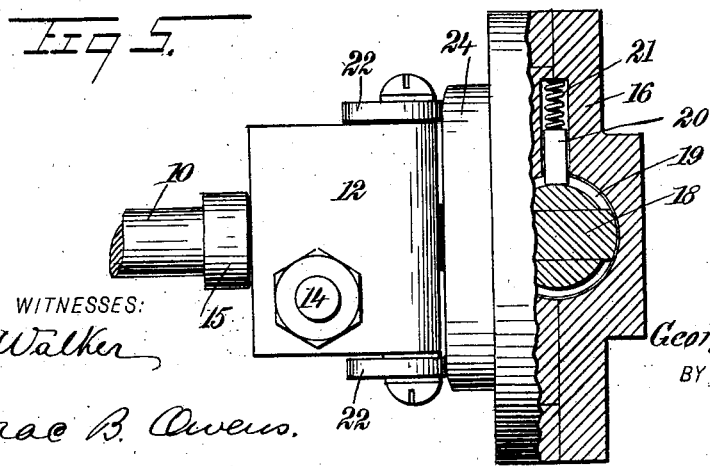
WITNESSES:
H. Walker
Isaac B. Owens.
INVENTOR
George R. Boulding
BY
ATTORNEYS.

No. 732,510. Patented June 30, 1903.

UNITED STATES PATENT OFFICE.

GEORGE ROBERT BOULDING, OF WELLS, NEVADA, ASSIGNOR OF ONE-HALF TO ROBERT M. STEELE AND AMOS C. OLMSTEAD, OF WELLS, NEVADA.

VEHICLE-FRAME AND DRIVING-AXLE GEAR.

SPECIFICATION forming part of Letters Patent No. 732,510, dated June 30, 1903.

Application filed December 31, 1902. Serial No. 137,322. (No model.)

*To all whom it may concern:*

Be it known that I, GEORGE ROBERT BOULDING, a citizen of the United States, and a resident of Wells, in the county of Elko and State of Nevada, have invented a new and Improved Vehicle-Frame and Driving-Axle Gear, of which the following is a full, clear, and exact description.

This invention relates to an improved gear for mounting the driving-wheels of power-driven vehicles, such as automobile carriages and trucks and traction-engines.

In its general form the apparatus comprises a driving-axle and wheel-hubs of certain special construction mounted on the axle, so that they may be slewed independently thereof to steer the vehicle and so also that one wheel may turn faster than the other in rounding corners, thus preventing sliding of the wheels.

The invention preferably is applied to the front axle, and in such case this axle is the driver.

The invention also comprises a specially-constructed frame, the principal feature of which is its jointed arrangement, which allows the frame a certain limited flexibility, enabling the vehicle easily to ride over an uneven road-surface.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a plan view of the vehicle-frame. Fig. 2 is a section on the line 2 2 of Fig. 1. Fig. 3 is a sectional plan view on the line 3 3 of Fig. 2. Fig. 4 is a section on the line 4 4 of Fig. 2, and Fig. 5 is a sectional elevation on the line 5 5 of Fig. 4.

10 indicates the front driving-axle, and 11 the rear axle. On each end portion of each axle is mounted a box 12, the axles turning freely in these boxes, and said boxes are connected longitudinally together in pairs by the side frame-rods 14, which are loosely mounted in the boxes. The boxes 12 may be of sectional or integral construction, as desired, and in case they are sectional the parts may be clamped together by bolts. The boxes are held from longitudinal movement on the axles and connecting-rods by means of collars or shoulders 15 or any other desired means. This construction provides a jointed frame which will "work" as the vehicle runs and will permit the vehicle to ride over uneven road-surfaces without disturbing the complete engagement of all four of the wheels with the ground.

The rear wheels may be of any desired construction, and each front wheel comprises a specially-constructed hub and mounting-gear, which will now be described. These hubs are indicated at 16, and they are preferably formed of two disk-like sections fastened together, as illustrated. In each hub 16 is formed a spherical cavity 17, which receives the spherical ends 18 of the axle 10. In said spherical ends 18 one or more shouldered grooves 19 are formed, and with said grooves work beveled dogs 20, which serve to connect the axle with the wheels as the axle turns forward, but which run idly over the spheres 18 when the axle turns rearwardly or when the wheel is turned forward relatively to the axle.

21 indicates springs for pressing the dogs 20 into action.

On the boxes 12 of the axle 10 are mounted rotary disks 22, which are preferably two for each box, one at the top and one at the bottom thereof. These disks 22 engage in tangentially-disposed grooves 23, formed in annuli 24, which are located one at each end of the axle 10 and are set into annular cavities 25, formed in the hubs 16. The grooves 23 have convex walls 23ª therein, which engage the disks 22.

26 indicates antifriction bearing-balls which operate between the parts 24 and 16. These devices are of such arrangement that the wheels may ride freely independently of the annuli; but when the annuli are slewed or turned around the disks 22 the wheels are enforced to move correspondingly, and thus the vehicle is slewed.

27 indicates the steering-rod, which passes transversely across the front portion of the machine and which has ball-bearing connection 28 with the respective annuli 24. A suitable steering-lever 29 may be connected with the rod 27.

30 indicates the motor, which I prefer to mount on the vehicle-body.

31 indicates the driving connection to the front axle, and 32 to the rear axle. By this rear connection 32 the vehicle may be driven backward.

From the foregoing description it will be apparent that I provide a jointed or yielding frame and also a construction in which the vehicle may be steered by turning the wheels on the axle; further, by connecting the wheels with the axle through the dogs 20, as described, the wheels may turn ahead faster than the movement of the axle, and this compensates for the uneven movement of the wheels in turning curves.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. In a vehicle, the combination with the frame of a driving-axle, a wheel-hub mounted to slew, a means working between the axle and wheel-hub to drive the latter from the former, an annulus with which the wheel-hub has rotary connection, means for mounting said annulus to rock on the frame, and an independent means for imparting a rocking movement to the annulus.

2. The combination of a driving-axle, a wheel-hub mounted to slew, a means working between the axle and wheel-hub to drive the latter as the former turns in one direction, an annulus with which the wheel-hub has rotary connection, means for mounting said annulus to rock, and means for imparting a rocking movement to the annulus, said means for mounting the annulus comprising a turnable disk engaged with the annulus.

3. The combination of a driving-axle, a wheel-hub mounted to slew, a means working between the axle and wheel-hub to drive the latter from the former, an annulus with which the wheel-hub has rotary connection, means for mounting said annulus to rock, and means for imparting a rocking movement to the annulus, said means for mounting the annulus comprising a turnable disk and the annulus having a convex surface on which the disk bears.

4. The combination of a driving-axle having a spherical end, a wheel-hub mounted loosely on said end, a dog working between the end of the drive-shaft and the hub to drive the latter in one direction, an annulus with which the wheel-hub has rotary connection, means for mounting said annulus to rock, and means for imparting a rocking movement to the annulus.

5. The combination of a driving-axle having a spherical end, a wheel-hub mounted loosely on said end, a dog working between the end of the drive-shaft and the hub to drive the latter in one direction, an annulus with which the wheel-hub has rotary connection, means for mounting said annulus to rock, and means for imparting a rocking movement to the annulus, said means for mounting the annulus comprising a turnable disk engaged therewith.

6. The combination of a driving-axle having a spherical end, a wheel-hub mounted loosely on said end, a dog working between the end of the drive-shaft and the hub to drive the latter in one direction, an annulus with which the wheel-hub has rotary connection, means for mounting said annulus to rock, and means for imparting a rocking movement to the annulus, said means for mounting the annulus comprising a turnable disk and the annulus having a tangential surface on which the disk bears.

7. In a rectangular vehicle-frame, the combination of two axles, side connecting-rods passing longitudinally between them, and boxes at the four corners of the frame, said boxes joining the rods and axles, and with all of which boxes the rods and axles are connected to turn around their longitudinal axis.

8. The combination of a driving-axle, a box in which the same is arranged to turn, a side frame-rod also arranged to turn in the box, an annulus mounted to rock on the box, means for rocking the annulus, and a wheel-hub mounted to slew on the axle and having rotary connection with the annulus.

9. The combination of a driving-axle, a wheel-hub mounted to slew thereon, means working between the axle and hub, to drive the latter, a member with which the wheel-hub has rotary connection, means for rockably mounting said member on the frame, and an independent means for rocking said member.

In testimony whereof I have signed my name to this specification in the presence of two subscribing witnesses.

GEORGE ROBERT BOULDING.

Witnesses:
AMOS C. OLMSTED,
MELS BADT.